(12) United States Patent
Swanson et al.

(10) Patent No.: US 7,922,467 B2
(45) Date of Patent: Apr. 12, 2011

(54) SYSTEM FOR PROTECTING BEARINGS AND SEALS OF A REFRIGERANT COMPRESSOR

(75) Inventors: Robert M. Swanson, La Crosse, WI (US); Joel S. Duga, Onalaska, WI (US); David M. Foye, La Crosse, WI (US)

(73) Assignee: Trane International Inc, Piscataway, NJ (US)

( * ) Notice: Subject to any disclaimer, the term of this patent is extended or adjusted under 35 U.S.C. 154(b) by 1132 days.

(21) Appl. No.: 11/650,279

(22) Filed: Jan. 5, 2007

(65) Prior Publication Data
US 2008/0166246 A1 Jul. 10, 2008

(51) Int. Cl.
*F04D 17/08* (2006.01)
*F04D 29/056* (2006.01)
*F04D 29/60* (2006.01)

(52) U.S. Cl. ........... 417/423.7; 417/423.12; 417/423.14; 310/68 R; 310/71; 310/89; 310/90

(58) Field of Classification Search .................. 310/196, 310/182, 68 R, 71, 89, 90; 417/45, 423.7, 417/423.12, 423.14
See application file for complete search history.

(56) References Cited

U.S. PATENT DOCUMENTS

| | | | | |
|---|---|---|---|---|
| 3,122,894 A | * | 3/1964 | Bernhard | 62/117 |
| 6,987,338 B1 | * | 1/2006 | Lavasser et al. | 310/71 |
| 2004/0056543 A1 | * | 3/2004 | Melfi | 310/68 R |
| 2005/0174812 A1 | * | 8/2005 | Wu | 363/39 |

* cited by examiner

*Primary Examiner* — Devon C Kramer
*Assistant Examiner* — Philip Stimpert
(74) *Attorney, Agent, or Firm* — William O'Driscoll

(57) ABSTRACT

To protect the bearings, lubricant and seals of a refrigerant compressor, the compressor includes one or more inductors for mitigating a high frequency common mode current that produces a high frequency shaft voltage. Each inductor is a ring of magnetic material encircling three insulated cables that convey three-phase power from an adjustable frequency drive to the compressor's motor. Without the inductors, the high frequency shaft voltage can become damagingly high due to the length of a cast iron housing that can be particularly long if the housing contains both a motor and several centrifugal impellers. The high frequency shaft voltage is just one component of a composite adverse shaft voltage. Another component, known as an operationally induced shaft voltage, can be reduced by a grounding contact, so instead of using just an inductor or just a contact, both can be used to provide a total solution to the problem.

30 Claims, 6 Drawing Sheets

US 7,922,467 B2

SYSTEM FOR PROTECTING BEARINGS AND SEALS OF A REFRIGERANT COMPRESSOR

BACKGROUND OF THE INVENTION

1. Field of the Invention

The subject invention generally pertains to centrifugal compressors, screw compressors and other types of compressors of hermetically sealed refrigerant systems and more specifically to a means for protecting the motor bearings and seals of such compressors.

2. Description of Related Art

For years, it has been known that adverse shaft voltage can develop between the shaft and housing of electric motors. When the voltage discharges with sufficient energy across a bearing that supports the shaft, the resulting current can damage the bearing through electrical arcing and/or by degrading the bearing's lubricant.

The shaft voltage can actually be a combination of voltages originating from different sources. It can be electrostatically generated within the motor, or the voltage can arise from imbalanced ampere-turns in the stator or from stator or rotor asymmetries. In cases where the motor is driven by an AFD (adjustable frequency drive) with high speed power switching devices (e.g., insulated gate bipolar transistors), the rapid switching rate of the power switching devices can generate a high frequency common mode voltage that can ultimately lead to a damaging component of the shaft voltage.

Attempts at solving the shaft voltage problem have involved various means such as shaft-grounding brushes, electrically insulated bearings, ceramic bearings, low impedance lubricant, common mode inductors or line filters applied to the motor's AFD.

Although such solutions may be effective for a typical motor driven by an AFD, centrifugal refrigerant compressors do not fit this simple model. Centrifugal refrigerant compressors are unique in that the motor and the compressor share a common housing. With a shared common housing, some mixing of the lubricant and the refrigerant can occur, which can alter the dielectric and/or other properties of the lubricant. Also, various properties of the housing and even the quantity and location of the impellers within the housing seem to have an effect on the induced shaft voltage.

Since centrifugal refrigerant compressors do not fit the typical inverter/motor model, it has been painfully discovered that previous shaft voltage mitigating solutions are not always successful when applied to refrigerant-based systems. For centrifugal refrigerant compressors, solutions that have worked in the past are often found to be unsuccessful today, which suggests that something has changed.

Identifying which particular change or changes are making present shaft voltage problems more difficult to correct is very challenging. Some of the variables may include new refrigerants, new lubricants, new bearings, different refrigerant seals, and the style of the compressor housing as it relates to the quantity and layout of the compressor's impellers.

To fully correct the shaft voltage problem, a need exists for a total solution or a set of solutions that can be successfully applied to centrifugal refrigerant compressors of various designs and configurations.

SUMMARY OF THE INVENTION

It is an object of the invention to protect the bearings, seals, and/or the lubricant of a refrigerant compressor by mitigating a composite adverse shaft voltage that develops between the shaft and the compressor's housing.

Another object of some embodiments is to mitigate the composite adverse shaft voltage by reducing the amplitude and/or frequency of a high frequency common mode current that influences the composite adverse shaft voltage.

Another object of some embodiments is to reduce the frequency of the high frequency common mode current to a lower, non-damaging level (preferably less than 500 kHz) by installing an inductor ring of magnetic material that encircles three insulated conductors (forming an inductor) that convey three-phase electrical power from an AFD to a compressor system.

Another object of some embodiments is to minimize the damaging effects of a composite adverse shaft voltage by installing both a grounding brush device and an inductor in an existing functional compressor system, wherein the grounding brush device reduces or drains off an operationally induced shaft charge, reducing voltage, and the inductor mitigates the high frequency common mode current.

Another object of some embodiments is to reduce the frequency and/or amplitude of the high frequency common mode current flowing in a compressor system that includes a cast iron housing, steel piping, and a ground return path conductor, wherein the material of the steel piping is more electrically conductive than the cast iron material of the housing but is less electrically conductive than the material of the ground return path conductor.

Another object of some embodiments is to strategically position the point at which the ground return path conductor connects to the housing of the compressor system to minimize the adverse effects of high frequency common mode currents.

Another object of some embodiments is to use a rolling element bearing and a hydrodynamic bearing to support a shaft within a motor housing, and to connect the ground return path conductor to the housing at point that minimizes internal voltage to the rolling element bearing, thereby protecting the rolling element bearing, which is particularly susceptible to being damaged by electrical discharge.

Another object of some embodiments is to add a number of inductors to a compressor that includes a number of impellers, wherein the number of inductors is at least as great as the number of impellers.

Another object of some embodiments is to prolong the life of a lubricant that might be diluted by refrigerant.

Another object of some embodiments is to mitigate a composite adverse voltage by reducing the frequency and/or the amplitude of just certain components of the composite adverse voltage.

Another object of some embodiments is to retrofit an existing functional compressor with a grounding brush device by replacing a sight glass of the compressor with the grounding brush device.

Another object of some embodiments is to retrofit an existing functional compressor with a plurality of inductors.

One or more of these and/or other objects of the invention are provided by a refrigerant compressor system that includes an inductor comprising a ring of magnetic material(a choke) encircling three insulated conductors, wherein the conductors provide the compressor with three-phase electrical power from an adjustable frequency drive that includes a plurality of power switching devices.

The present invention provides a refrigerant system including a conductive housing made of a conductive material, a refrigerant disposed within the conductive housing, a motor, a compressing element, and an adjustable frequency drive. The conductive housing includes a motor housing and a compressor housing, and the motor includes a rotor, a shaft extending from the rotor, a stator winding disposed within the motor housing in proximity with the rotor, and a bearing supporting the shaft and the rotor within the motor housing. The compressing element is disposed within the compressor housing and is coupled to the rotor such that rotation of the rotor motivates the compressing element to compress the refrigerant. The adjustable frequency drive provides the stator winding with three-phase electrical power to rotate the rotor and three conductors electrically coupling the adjustable frequency drive to the stator winding such that the three conductors can convey the three-phase electrical power to the stator winding. The system also includes an inductor, a refrigerant loop, a common mode current loop and a loop of electrical continuity. The inductor is formed of a ring of magnetic material encircling the three conductors. The refrigerant loop includes the conductive housing, a first heat exchanger, an expansion device, and a second heat exchanger, wherein the compressing element forces the refrigerant to circulate through the refrigerant loop. The common mode current loop includes the adjustable frequency drive, the three conductors, the stator winding, and a capacitive coupling between the compressing element and the conductive housing. The loop of electrical continuity includes the conductive housing, the first heat exchanger, the second heat exchanger, a discharge line extending between the conductive housing and the first heat exchanger, a suction line extending between conductive housing and the second heat exchanger, and an expansion line extending between the first heat exchanger and the second heat exchanger.

The invention may also include a ground return path conductor extending between the conductive housing and the adjustable frequency drive and made of a material that has greater electrical conductivity than the conductive material, or a grounding contact device supported by the conductive housing and operably contacting the shaft and providing an electrical path between the conductive housing and the shaft.

The present invention also provides a compressor system including a conductive housing, a refrigerant disposed within the conductive housing, a motor, at least one compressing element, an adjustable frequency drive, and a plurality of inductors. The conductive housing is made of a conductive material and includes a motor housing and a compressor housing. The motor that includes a rotor, a shaft extending from the rotor, a stator winding disposed within the motor housing in proximity with the rotor, and a bearing supporting the shaft and the rotor within the motor housing. The compressing element is disposed within the compressor housing and is coupled to the rotor such that rotation of the rotor motivates the compressing element to compress the refrigerant wherein a capacitance is formed between the compressing element and the conductive housing. The adjustable frequency drive provides the stator winding with three-phase electrical power to rotate the rotor and three conductors electrically couple the adjustable frequency drive to the stator winding such that the three conductors can convey the three-phase electrical power to the stator winding. The plurality of inductors are arranged in an installed position encircling the three conductors. Each inductor is formed from a ring of magnetic material. A high frequency common mode voltage exists between the conductive housing and the stator winding and the high frequency common mode voltage drives a high frequency common mode current through the conductive housing. The plurality of inductors is sufficient to reduce the common mode current.

The present invention further provides a compressor system including a conductive housing, a refrigerant disposed within the conductive housing, a motor, at least one compressing element, an adjustable frequency drive, an inductor, and a grounding contact device. The conductive housing is made of a conductive material and includes a motor housing and a compressor housing. The motor that includes a rotor, a shaft extending from the rotor, a stator winding disposed within the motor housing in proximity with the rotor, and a bearing supporting the shaft and the rotor within the motor housing. The compressing element is disposed within the compressor housing and is coupled to the rotor such that rotation of the rotor motivates the compressing element to compress the refrigerant wherein a capacitance is formed between the compressing element and the conductive housing. The adjustable frequency drive provides the stator winding with three-phase electrical power to rotate the rotor and three conductors electrically couple the adjustable frequency drive to the stator winding such that the three conductors can convey the three-phase electrical power to the stator winding. The inductor may be formed from a ring of magnetic material encircling the three conductors, and the grounding contact device is supported by the motor housing and is in electrical contact with the shaft. The compressor system may also include at least one compressing element and a number of inductors wherein the number of inductors is sufficient to create an inductance reducing a common mode current.

The present invention further provides a compressor system including a conductive housing, a refrigerant disposed within the conductive housing, a motor, at least one compressing element, an adjustable frequency drive, and an inductor. The conductive housing is made of a conductive material and includes a motor housing and a compressor housing. The motor that includes a rotor, a shaft extending from the rotor, a stator winding disposed within the motor housing in proximity with the rotor, and a bearing supporting the shaft and the rotor within the motor housing. The compressing element is disposed within the compressor housing and is coupled to the rotor such that rotation of the rotor motivates the compressing element to compress the refrigerant wherein a capacitance is formed between the compressing element and the conductive housing. The adjustable frequency drive with a plurality of switching devices that provide the stator winding with three-phase electrical power to rotate the rotor and the shaft at various speeds including a certain rated speed and torque. Three conductors electrically couple the adjustable frequency drive to the stator winding such that the three conductors can convey the three-phase electrical power to the stator winding and upon doing so the conductive housing is subjected to a composite adverse voltage that is comprised of a plurality of component voltages including a high frequency shaft voltage and an operationally induced shaft voltage. A high frequency common mode voltage is caused by a switching operation of the plurality of switching devices and exists between the conductive housing and the stator winding, and the high frequency common mode voltage drives a high frequency common mode current through the conductive housing. The high frequency common mode current passing through the conductive housing creates a high frequency internal voltage, the high frequency internal voltage provides the high frequency shaft voltage between the conductive housing and the shaft; and the operationally induced shaft voltage exists between the conductive housing and the shaft and is influenced by at least one of an imbalanced ampere-turns of the stator winding, a stator winding asymmetry, a rotor asymmetry, and an electrostatic charge due to operation of the compressor system. The inductor includes a ring of magnetic material and is in an installed position encircling the three conductors. The adjustable frequency drive can power the stator winding to rotate the rotor at the certain rated speed and torque even if the inductor were omitted such that at the certain rated speed and torque the high frequency common mode current has a frequency that is lower by a certain percentage when the inductor is in the installed position than if the inductor were omitted, and the certain percentage is such that the inductor has a greater effect on the high frequency common mode current than on the high frequency common mode voltage, and the inductor has a greater effect on the high frequency common mode current than on the operationally induced shaft voltage, the certain percentage is sufficient to appreciable mitigate the composite adverse voltage.

The present invention yet further provides a method of retrofitting a compressor system. The compressor system includes a housing; a sight glass supported by the housing in an aperture; a motor that includes a rotor, a shaft extending from the rotor, a stator winding disposed within the housing in proximity with the rotor, and a bearing supporting the shaft and the rotor within the housing; a compressing element disposed within the housing and being coupled to the rotor such that rotation of the rotor motivates the compressing element to compress a refrigerant; an adjustable frequency drive that provides the stator winding with three-phase electrical power to rotate the rotor; and three conductors electrically coupling the adjustable frequency drive to the stator winding such that the three conductors can convey the three-phase electrical power to the stator winding. The method includes the steps of removing the sight glass from the aperture; and inserting a grounding contact device into the aperture such that the grounding contact device is in electrical contact with the shaft.

The present invention still further provides a method of retrofitting a functional compressor system. The functional compressor system includes a housing; a motor that includes a rotor, a shaft extending from the rotor, a stator winding disposed within the housing in proximity with the rotor, and a bearing supporting the shaft and the rotor within the housing; a compressing element disposed within the housing and being coupled to the rotor such that rotation of the rotor motivates the compressing element to compress a refrigerant; an adjustable frequency drive that provides the stator winding with three-phase electrical power to rotate the rotor; and three conductors electrically coupling the adjustable frequency drive to the stator winding such that the three conductors can convey the three-phase electrical power to the stator winding. The method includes the steps of temporarily disabling the functional compressor system; temporarily disconnecting the three conductors; inserting the three conductors through an annular inductor; reconnecting the three conductors; and restoring operation to the functional compressor system. The method may also include the steps of operating the functional compressor system without the annular inductor; prior to temporarily disconnecting the three conductors, generating a first high frequency common mode voltage that drives a first high frequency common mode current through the housing; and after reconnecting the three conductors and restoring operation to the functional compressor system, generating a second high frequency common mode voltage that drives a second high frequency common mode current through the housing, wherein a voltage ratio of the first high frequency common mode voltage to the second high frequency common mode voltage is less than a current ratio of the first high frequency common mode current to the second high frequency common mode current.

DESCRIPTION OF THE PREFERRED EMBODIMENT

Figure 1:
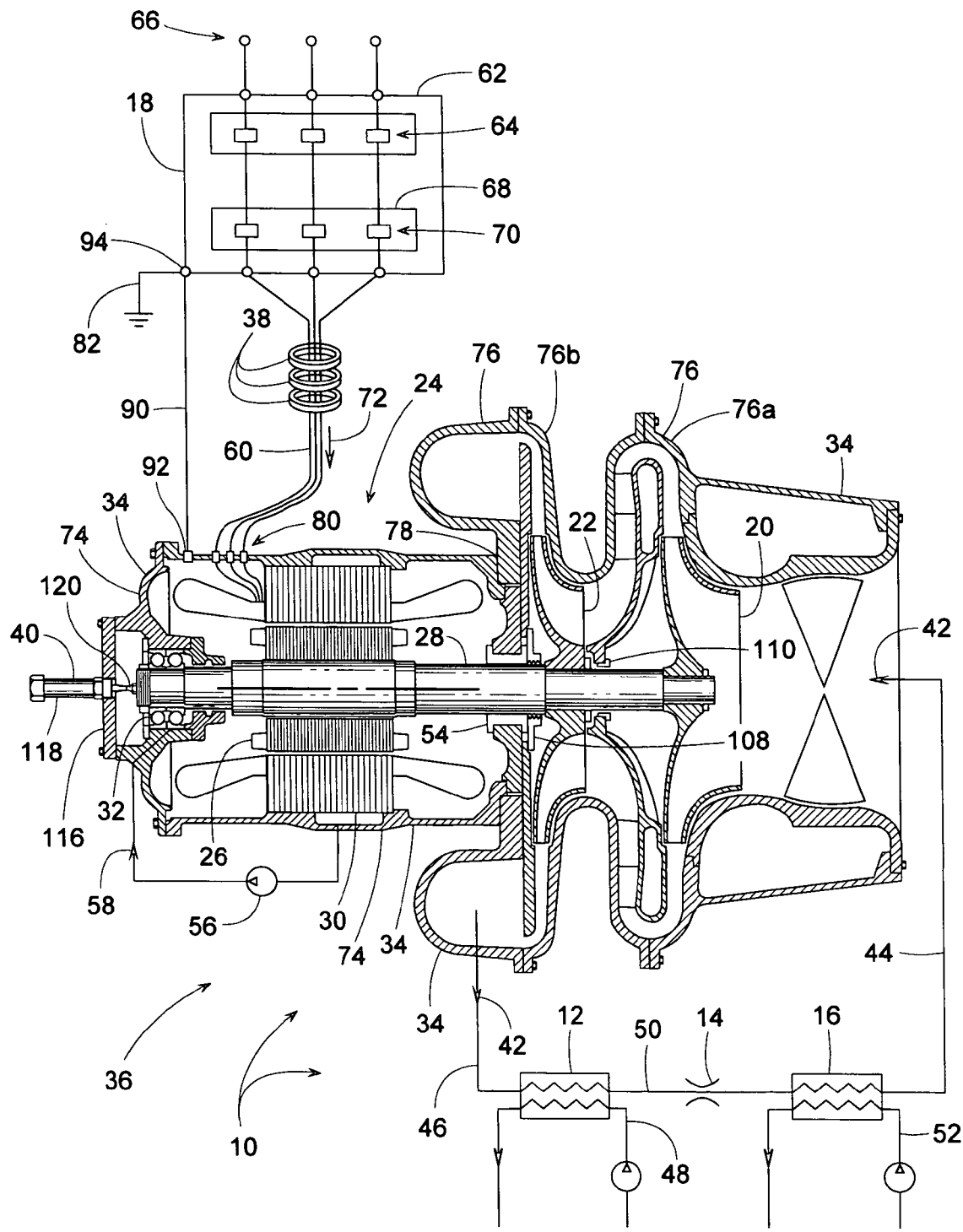
FIG. 1 is a schematically illustrated refrigerant circuit with a cross-sectional view of a compressor system powered by a schematically illustrated AFD.

A refrigerant system 10, shown in FIG. 1, comprises a condenser 12, an expansion device 14, an evaporator 16, and a compressor system 36 driven at varying speed by an AFD 18 (adjustable frequency drive). For the illustrated embodiment, compressor system 10 comprises two centrifugal impellers (a first stage impeller 20 and a second stage impeller 22) driven by a motor 24, wherein motor 24 includes a rotor 26, a shaft 28 extending from rotor 26, stator windings 30, and at least one rolling element bearing 32 that helps support shaft 28 within a cast iron housing 34. Compressor system 36 includes one or more inductors 38 and/or a grounding contact device 40 (typically a brush) to help protect bearing 32 against a composite adverse shaft voltage. The composite adverse shaft voltage and its various components will be explained after a more detailed description of refrigerant system 10 and compressor system 36.

Refrigerant system 10 contains a refrigerant 42 (e.g., R123, R134a, R410, R410a, R22, etc.) that compressor system 36 forces from a suction line 44 to a discharge line 46. In the most basic form of system 10, refrigerant discharged to line 46 flows generally sequentially through a first heat exchanger such as condenser 12 for releasing heat to a heat sink 48 (e.g., via air cooled fin heat exchanger, evaporative cooling tower, a water cooled shell-and-tube heat exchanger, etc.), through an expansion line 50 for cooling the refrigerant by expansion, and through a second heat exchanger such as evaporator 16 (e.g., a chilled water shell-and-tube heat exchanger) where refrigerant therein vaporizes upon absorbing heat from a cooling load 52. From evaporator 16, suction line 44 returns vaporized refrigerant back to compressor system 36 to repeat the cycle. Numerous variations of system 10, including more or less stages of compression and the use of economizer circuits, are well known to those of ordinary skill in the art and are well within the scope of the invention.

Although the actual structure of compressor system 36 may vary, the illustrated embodiment has shaft 28 supporting both rotor 26 of motor 24 and at least one compressor element. The term, "compressor element" refers to any component that can be driven to compress a gas. Examples of a compressor element include, but are not limited to, centrifugal impellers 20 and 22, an axial impeller, a multi-lobed screw compressor rotor, an involute scroll compressor rotor, and the like. Exemplary compressor elements are shown in commonly assigned U.S. Pat. Nos. 5,553,997; 6,068,457; 6,116,046; and 6,167,713, each of which is hereby incorporated by reference. Also, although a single shaft is shown supporting both rotor 26 and impellers 20 and 22, it is well within the scope of the invention to have rotor 26 and the impellers be supported by two separate shafts that are coupled to each other by way of gears or some other appropriate coupling.

For the direct drive example of FIG. 1, bearing 32 supports one end of shaft 28, and a second bearing 54 supports shaft 28 at an intermediate point so that shaft 28 can support impellers 20 and 22 in a cantilevered manner. Bearing 32 can be a rolling element duplex bearing for providing shaft 28 with both axial and radial support, while bearing 54 can be a hydrodynamic bearing solely for providing radial support. An oil pump 56 can be used to circulate a lubricant 58 through bearings 32 and 54. Rotor 26, which is situated between bearings 32 and 54, is encircled by stator windings 30 that are supported by a conductive housing 34 typically formed of cast iron but also formable from other conductive materials such as, for example, steel. The term, "stator windings" refers to a stator core plus the actual coil of wires associated with the core.

To drive compressor system 36 at various speeds, three insulated conductors 60 electrically couple AFD 18 to stator windings 30. One example of AFD 18 is a "LiquiFlo 2.0 AC Drive" manufactured by Reliance Electric, which is part of Rockwell Automation of Milwaukee, Wis. with further headquarters in Greenville, S.C. AFD 18 includes a converter section 62 with a plurality of power switching devices 64 for converting an incoming 3-phase AC supply voltage 66 to a DC voltage. AFD 18 also includes an inverter section 68 electrically coupled to converter section 62. Inverter section 68 comprises a plurality of power switching devices 70 for converting the DC voltage to a variable frequency 3-phase electrical power 72 that conductors 60 feed to stator windings 30. Examples of power switching devices 64 and 70 include, but are not limited to, insulated gate bipolar transistors. The primary frequency of power 72 is generally less than a few hundred hertz so as to rotate rotor 26 at a reasonable speed within housing 34.

Cast iron housing 34 comprises a cast iron motor housing 74 and a cast iron compressor housing 76 that can be bolted or otherwise connected at a housing joint 78. The term, "cast iron" refers to an iron-based material containing at least 2% carbon. Housings 74 and 76 can each be an assembly of components. Compressor housing 76, for instance, might be comprised of a first stage housing 76a containing impeller 20 and a second stage housing 76b containing impeller 22. Motor housing 74 generally contains rotor 26 and stator windings 30.

Refrigerant 42 exists within motor housing 74 as well as in compressor housing 76, thus lubricant 58 in motor housing 74 can be contaminated with at least a trace of refrigerant 42, and refrigerant 42 in compressor housing 76 may contain at least a trace of lubricant 58. A trace amount of refrigerant can alter the dielectric and/or other properties of lubricant 58, so the contamination might be a factor that alters the effect that the composite adverse voltage has on the lifespan of bearing 32 and/or lubricant 58.

Figure 2:
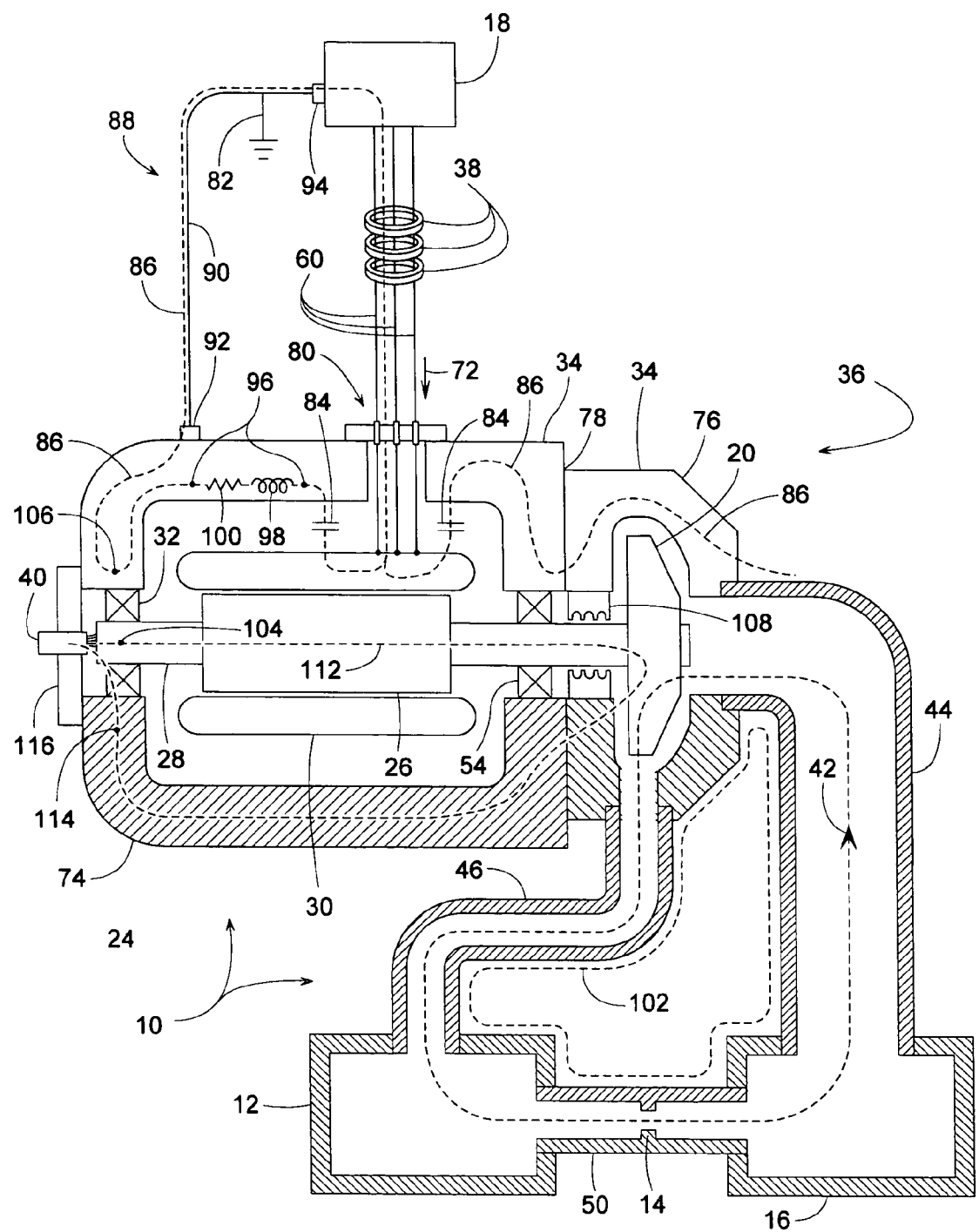
FIG. 2 is a schematic view of the system of FIG. 1.
Figure 3:
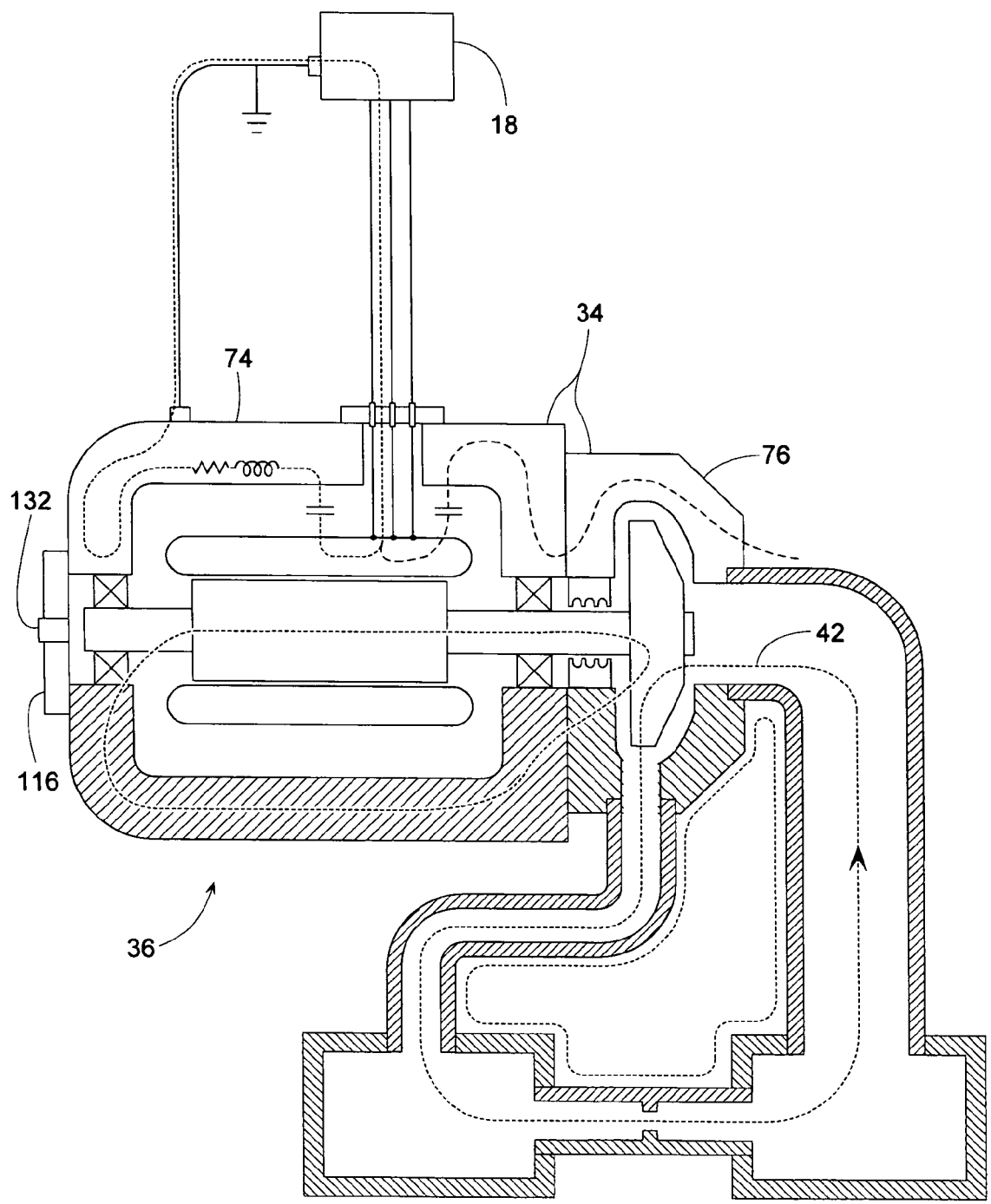
FIG. 3 is a schematic view similar to FIG. 2 but with a grounding contact device and a plurality of inductors omitted.

The composite adverse voltage can best be understood with reference to the schematic diagrams of FIGS. 2 and 3. FIG. 2 corresponds to FIG. 1, and FIG. 3 is similar to FIG. 2 but with inductor 38 and grounding brush device 40 omitted. To help explain the composite adverse voltage and related phenomena, some definitions are provided as follows.

High frequency common mode voltage refers to the component of voltage present at all three motor winding terminals 80 relative to a ground 82. The high frequency common mode voltage is not the primary component of the three-phase electrical power that drives rotor 26 at a few hundred hertz, but rather the high frequency common mode voltage is caused by the rapid switching rates or high dv/dt of the power switching devices within AFD 18. The rapid switching rates can generate frequencies in the range of 500 kHz to perhaps as high as 15 MHz. The term, "high frequency" used herein and throughout refers to at least 100 kHz.

High frequency common mode current refers to the electrical current flowing throughout housing 34 due to the high frequency common mode voltage and a winding-to-housing capacitance 84 that naturally exists between housing 34 and stator windings 30. Although common mode currents can have components across a broad frequency range, high frequency common mode current specifically refers to components that are at frequencies of at least 100 kHz. A dashed line 86 of FIG. 2 represents high frequency common mode current flowing through motor housing 74 and compressor housing 76. If lines 44 and 46 are made of a steel material (iron with less than 2% carbon) having greater electrical conductivity than that of housing 34, some high frequency common mode current might even flow through discharge line 46 or suction line 44. In some cases, lines 44 and 46 are comprised of mild steel that has an electrical conductivity that is greater than the cast iron of housing 34. High frequency common mode current can also flow along a common mode current loop 88 comprising AFD 18, the three insulated conductors 60, stator windings 30, capacitive coupling 84, and a ground return path conductor 90 extending between housing 34 and AFD 18. To minimize the voltage potential between a point 92 on housing 34 and a second point 94 on AFD 18, conductor 90 can be made of a material, such as copper, that has an electrical conductivity that is greater than that of the cast iron material of housing 34. The copper of ground return path conductor 90 might also have an electrical conductivity that is greater than the mild steel of lines 44 and 46. In some embodiments, however, ground return path conductor 90 can be made of steel or other electrically conductive materials. In cases where AFD 18 is mounted directly to housing 34, ground return path conductor 90 can be comprised of brackets, an electrical enclosure and/or fasteners that facilitate attaching AFD 18 to housing 34.

High frequency internal voltage, generally denoted by numeral 96, refers to voltage gradients created by high frequency common mode current flowing through housing 34. Due to the inherent inductance 98 and resistance 100 of housing 34, the high frequency internal voltage can vary along the length of housing 34 and can be affected by various physical characteristics of refrigerant system 10. Some examples of such physical characteristics include, but are not limited to, the overall length of housing 34, the number of impellers, the location of impellers 20 and 22 relative to the location of motor 24, the mass and thickness of housing 34, and various joints such as joint 78. A system loop of electrical continuity 102 might also affect the voltage gradients of the high frequency internal voltage, wherein the system loop of electrical continuity 102 might comprise various electrically conductive components such as cast iron housing 34, discharge line 46, condenser 16, expansion line 50, evaporator 16, and suction line 44.

High frequency shaft voltage is a voltage component that occurs at frequencies of at least 100 kHz and is due to a voltage differential between shaft 28 and the high frequency internal voltage. High frequency shaft voltage can exist across bearing 32, e.g., between a point 104 on shaft 28 and a nearby point 106 on housing 74. High frequency common mode current flowing throughout housing 34 creates high frequency internal voltage gradients that vary in amplitude and location, thus high frequency shaft voltage of varying amplitude may also develop at bearing 54 and at a labyrinth seal 108 or 110 associated with the rotating portion of compressor system 36.

Operationally induced shaft voltage, schematically represented by a line 112, is another voltage component that can exist across bearing 32, e.g., between point 104 on shaft 28 and a nearby point 114 on housing 34. Operationally induced shaft voltage occurs at frequencies that are substantially less than 100 kHz and can include static DC voltage. Operationally induced shaft voltage might develop due to various known or unknown reasons such as, for example, stator or rotor asymmetries, imbalanced ampere-turns in the stator, stator to rotor capacitance, or static charge generated by rotating members within housing 34.

Composite adverse shaft voltage is a total voltage that can exist across bearing 32 (e.g., between points 104 and 106) and can be a combination of component voltages such as the high frequency shaft voltage and the operationally induced shaft voltage. The high frequency common mode voltage, the high frequency common mode current, and the high frequency internal voltage might also influence the composite adverse shaft voltage's severity or its damaging impact on bearing 32, lubricant 58, seal 108, bearing 54, and other components of compressor system 36. The actual severity can be difficult to quantify because the potentially damaging impact can be a function of voltage amplitude, frequency, and total electrical discharge energy. In some cases, the composite adverse voltage across bearing 32 can lead to a dielectric breakdown of lubricant 58, and the resulting electrical discharge or current through bearing 32 can degrade the lubricant and/or pit the bearing's inner and outer races.

This problem can be addressed by mitigating one or more components or influencing factors of the composite adverse shaft voltage. In some embodiments, for example, the operationally induced shaft voltage can be reduced by adding grounding brush device 40 to motor housing 74. Brush 40 provides an electrically conductive path through which the operationally induced shaft voltage and can discharge directly into an endplate 116 of motor housing 74, whereby the current driven by the operationally induced shaft voltage can bypass bearing 32. Although grounding brush device 40 can be of various designs, in a currently preferred embodiment, device 40 comprises a tubular housing 118 that attaches to endplate 116 and an electrically conductive wire brush 120 that brushes against shaft 28 as the shaft rotates. Electrical current can flow from the end of shaft 28, through brush 120, through tubular housing 118, and into endplate 116 of motor housing 74.

Even if grounding brush device 40 can electrically ground the end of shaft 28, a high frequency shaft voltage might still exist between shaft 28 and various points of housing 34 (e.g., at bearing 32, bearing 54, or seal 108) because the high frequency common mode current 86 creates a range of voltage gradients (high frequency internal voltage) throughout housing 34. Thus, the high frequency shaft voltage, which is a component of the composite adverse shaft voltage, might still cause damage at some points along shaft 28 if grounding brush device 40 is the only solution being applied to address the problem.

To help prevent the high frequency shaft voltage from damaging bearing 32, ground return path conductor 90 might be connected to motor housing 74 at a point that is as close as possible to bearing 32. Doing so, however, would place ground return path conductor 90 a substantial distance from bearing 54 and seal 108, which could increase the amplitude of the high frequency shaft voltage at those locations, and thus create potential voltage discharge problems for bearing 54 and seal 108, especially if housing 34 is particularly long. As a compromise, connection point 92 should be at an optimum axial location that is best for bearings 32 and 54 and seal 108 as a whole. In the axial direction (along the length of housing 34, parallel to shaft 28), such an optimum location is between bearing 32 and seal 108, between bearing 32 and impeller 20, and preferably between bearings 32 and 54.

To further address the voltage discharge problem, the composite adverse shaft voltage can be effectively mitigated by reducing the amplitude or frequency of the high frequency shaft voltage, which can be accomplished by reducing the amplitude or frequency of the high frequency common mode current. It has been found that the amplitude and particularly the frequency of the high frequency common mode current can be reduced by adding inductance to common mode current loop 88. Such inductance can be added by installing one of more inductor 38, each of which can comprise a ring of magnetic material, so that inductor 38 encircle the three insulated conductors 60 but do not encircle ground return path conductor 90. Examples of magnet materials might include, but are not limited to, pure or various combinations of ferrite, iron oxide ceramic, manganese-zinc, nickel-zinc, etc.

The style and quantity of inductor 38 might depend on the style and size of compressor system 36 and refrigerant system 10. In some embodiments, inductor 38 is a Magnetec model number M-116 or M-117 (Magnetec GmbH of Langenselbold, Germany). The quantity and/or size of inductor 38 should be such that one or more inductor 38 provide sufficient inductance to reduce the magnitude and/or frequency of the common mode currents to a non-damaging level. Positive results have been achieved when the quantity of inductor 38 are equal to or greater than the quantity of compressing elements or impellers in compressor housing 76. Since inductor 38 encircle insulated conductors 60 and are not actually wired to them, compressor system 36 is functional regardless of whether inductor 38 are installed (FIG. 2) or omitted (FIG. 3).

Figure 4:
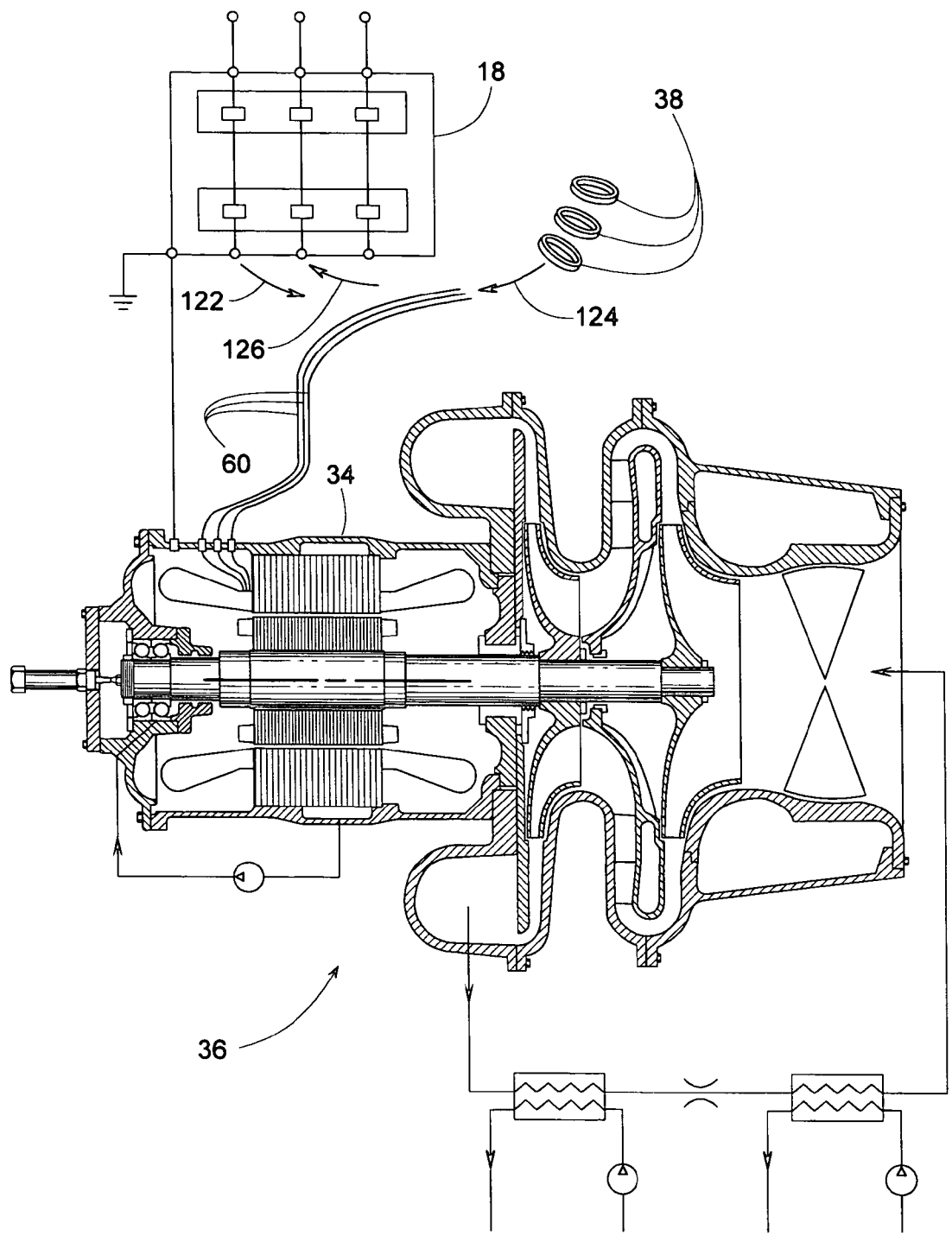
FIG. 4 is a view similar to FIG. 1 but showing a method of installing a plurality of inductor.

FIG. 4 illustrates a method of retrofitting an existing functional compressor system 36 with inductor 38. The retrofitting steps could be as follows: temporarily disabling compressor system 36 by de-energizing it, temporarily disconnecting the three insulated conductors 60 as indicated by arrow 122, inserting the three insulated conductors through inductor 38 as indicated by arrow 124, reconnecting the three insulated conductors 60 as indicated by arrow 126, and restoring operation to compressor system 36 by energizing it through AFD 18.

In some cases, the installation of inductor 38 reduces the frequency of the high frequency common mode current such that inductor 38 (for a given or certain rated speed and torque) has a greater effect (amplitude or frequency reduction) on the high frequency common mode current than on the high frequency common mode voltage, and inductor 38 has a greater effect on the high frequency common mode current than on the operationally induced shaft voltage. In other words, prior to installing inductor 38, compressor system 36 generates a first high frequency common mode voltage that drives a first high frequency common mode current through housing 34; and after installing inductor 38, compressor system 36 generates a second high frequency common mode voltage that drives a second high frequency common mode current through housing 34, wherein a voltage ratio of the first high frequency common mode voltage to the second high frequency common mode voltage is less than a current ratio of the first high frequency common mode current to the second high frequency common mode current. In some cases, the first high frequency common mode voltage is at a first frequency, the second high frequency common mode voltage is at a second frequency, the first high frequency common mode current is at a third frequency, the second high frequency common mode current is at a fourth frequency, and a first ratio of the first frequency to the second frequency may not be the same as a second ratio of the third frequency to the fourth frequency. Inductor 38 preferably reduces the frequency of the high frequency common mode current to less then 500 kHz.

Figure 5:
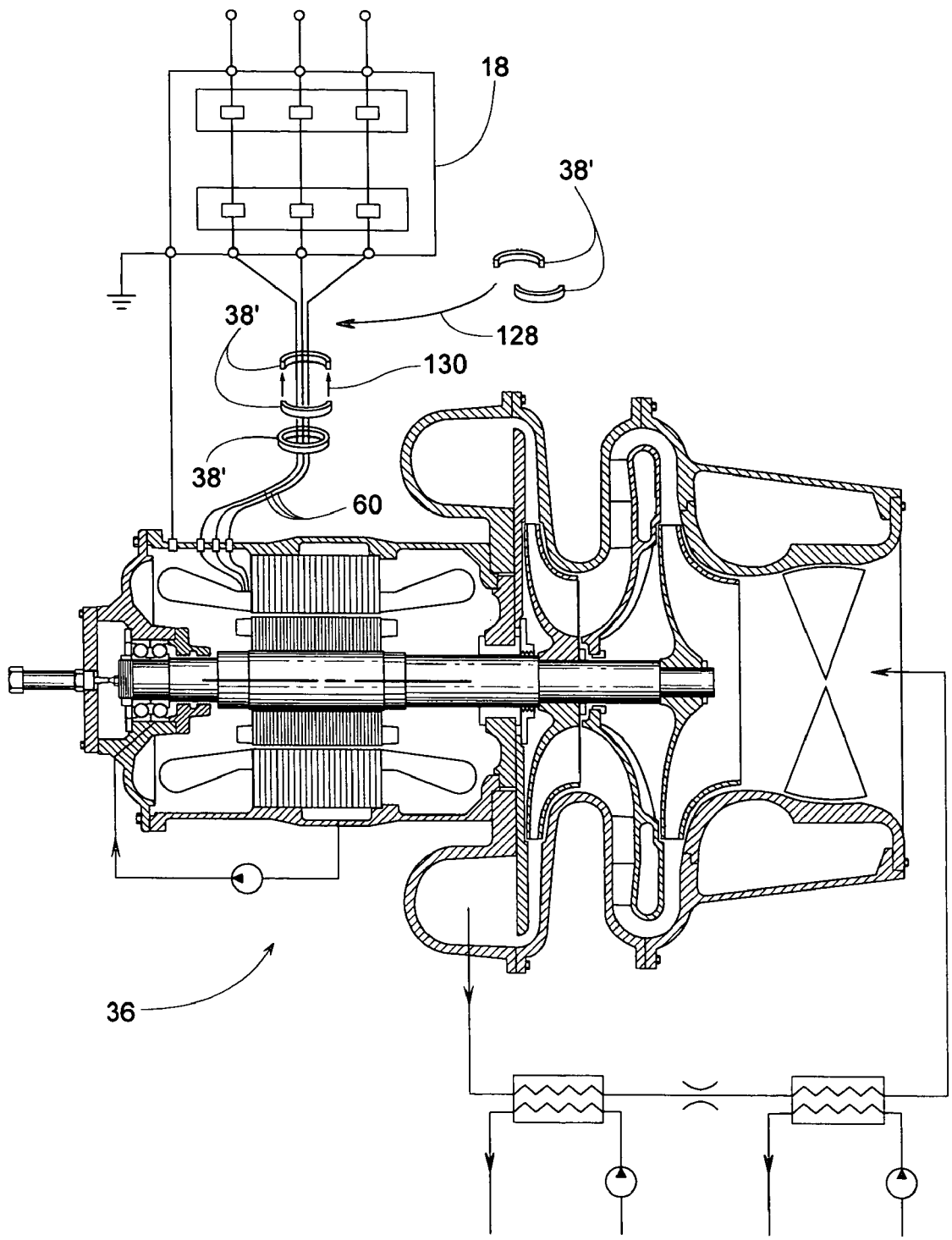
FIG. 5 is a view similar to FIG. 4 but showing another method of installing a plurality of inductor.

It is well within the scope of the invention to retrofit compressor system 36 without having to disconnect conductors 60. FIG. 5, for instance, shows a split inductor 38' formed from a ring of magnetic material that can be open and closed to facilitate its installation. In this case, the retrofitting steps could be as follows: selecting inductor 38' that is selectively configurable to an open position and a closed position; while inductor 38' is in the open position, positioning inductor 38' adjacent to the three insulated conductors 60 as indicated by arrow 128; reconfiguring inductor 38' to the closed position, as indicated by arrow 130, so that inductor 38' encircles the three insulated conductors 60; and clamping the two halves of inductor 38' together (via a hose clamp, tape, wire, clasp, fastener, etc.) so that inductor 38' is held in the closed position.

Figure 6:
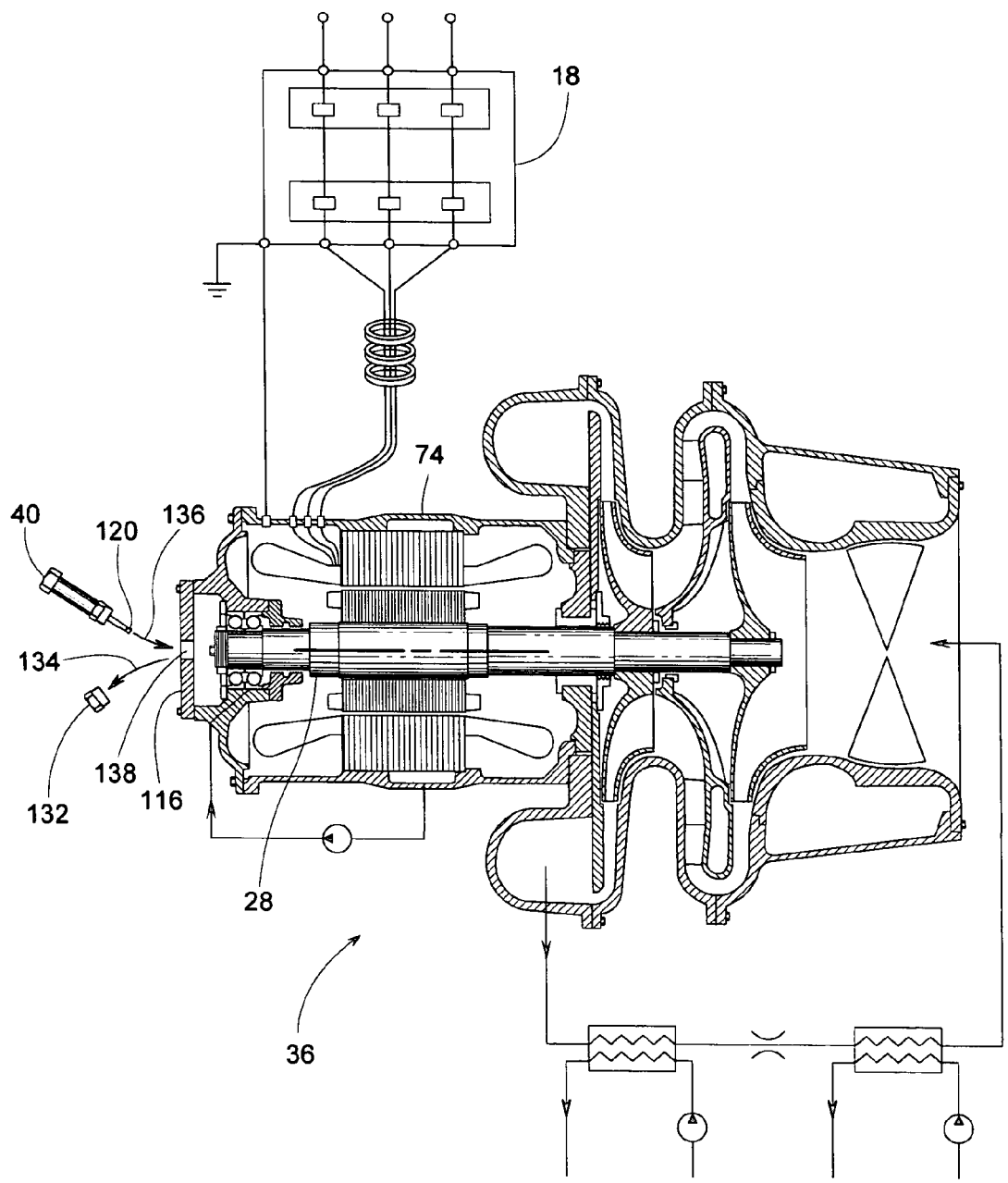
FIG. 6 is a view similar to FIGS. 1, 4 and 5 but showing a sight glass being replaced by a grounding brush device.

FIG. 6 illustrates a method of retrofitting an existing functional compressor system 36 with grounding contact device such as grounding brush device 40. The retrofitting steps could be as follows: unscrewing or otherwise removing an existing sight glass 132 from an aperture 138 in endplate 116 of motor housing 74, as indicated by arrow 134; and adding grounding brush device 40 to the aperture 138 in the housing 74, as indicated by arrow 136, such that grounding brush device 40 is in electrical contact with shaft 28. In some cases, grounding brush device 40 can be screwed into a threaded hole 138 from which sight glass 132 was removed.

Although the invention is described with respect to a preferred embodiment, modifications thereto will be apparent to those of ordinary skill in the art; therefore, the scope of the invention is to be determined by reference to the following claims.

The invention claimed is:

1. A refrigerant system, comprising:
   a conductive housing made of a conductive material, the conductive housing includes a motor housing and a compressor housing;
   a refrigerant disposed within the conductive housing;
   a motor that includes a rotor, a shaft extending from the rotor, a stator winding disposed within the motor housing in proximity with the rotor, and a bearing supporting the shaft and the rotor within the motor housing;
   a compressing element disposed within the compressor housing and being coupled to the rotor such that rotation of the rotor motivates the compressing element to compress the refrigerant;
   an adjustable frequency drive that provides the stator winding with three-phase electrical power to rotate the rotor;
   three conductors electrically coupling the adjustable frequency drive to the stator winding such that the three conductors can convey the three-phase electrical power to the stator winding;
   an inductor comprising a ring of magnetic material encircling the three conductors;
   a refrigerant loop comprising the conductive housing, a first heat exchanger, an expansion device, and a second heat exchanger, wherein the compressing element forces the refrigerant to circulate through the refrigerant loop;
   a common mode current loop comprising the adjustable frequency drive, the three conductors, the stator winding, a capacitive coupling between the compressing element and the conductive housing; and
   a loop of electrical continuity comprising the conductive housing, the first heat exchanger, the second heat exchanger, a discharge line extending between the conductive housing and the first heat exchanger, a suction line extending between conductive housing and the second heat exchanger, and an expansion line extending between the first heat exchanger and the second heat exchanger.

2. The refrigerant system of claim 1, further including a ground return path conductor extending between the conductive housing and the adjustable frequency drive, wherein the ground return path conductor is made of a material that has greater electrical conductivity than the conductive material.

3. The refrigerant system of claim 2, wherein the discharge line and the suction line are comprised of a material that has greater electrical conductivity than the conductive material but has less electrical conductivity than the material of the ground return path conductor.

4. The refrigerant system of claim 2, wherein the ground return path conductor lies outside the inductor, whereby the inductor does not encircle the ground return path conductor.

5. The refrigerant system of claim 2, wherein the ground return path conductor connects to the conductive housing at a point that minimizes internal voltage to the bearing.

6. The refrigerant system of claim 1, further comprising a grounding contact device supported by the conductive housing and operably contacting the shaft, thereby providing an electrical path between the conductive housing and the shaft.

7. The refrigerant system of claim 1, wherein the conductive housing is subjected to a composite adverse voltage that is comprised of a plurality of component voltages including an operationally induced shaft voltage, wherein a high frequency common mode voltage exists between the conductive housing and the stator winding and the high frequency common mode voltage drives a high frequency common mode current through the conductive housing and wherein the adjustable frequency drive can power the stator winding to rotate the rotor at a certain rated speed and torque even if the inductor were omitted such that, at the certain rated speed and torque, the high frequency common mode current has a frequency that is lower by a certain percentage when the inductor is in the installed position than if the inductor were omitted, and the certain percentage is such that the inductor has a greater effect on the high frequency common mode current than on the high frequency common mode voltage, and the inductor has a greater effect on the high frequency common mode current than on the operationally induced shaft voltage, the certain percentage is sufficient to appreciably mitigate the composite adverse voltage.

8. The refrigerant system of claim 1, wherein a high frequency common mode voltage exists between the conductive housing and the stator winding and the high frequency common mode voltage drives a high frequency common mode current through the conductive housing and wherein the refrigerant system includes at least one compressing element and a number of inductors, and wherein the number of inductors is sufficient to create an inductance reducing the common mode current.

9. The refrigerant system of claim 1, wherein a housing joint exists between the motor housing and the compressor housing and further including a lubricant lubricating the bearing; wherein the lubricant at the bearing includes at least a trace of the refrigerant.

10. The refrigerant system of claim 1, wherein the adjustable frequency drive includes a plurality of switching devices and wherein:
   a) a high frequency common mode voltage is caused by a switching operation of the plurality of switching devices and exists between the conductive housing and the stator winding;
   b) the high frequency common mode voltage drives a high frequency common mode current through the conductive housing;
   c) the high frequency common mode current passing through the conductive housing creates a high frequency internal voltage;

d) the high frequency internal voltage provides a high frequency shaft voltage between the conductive housing and the shaft; and e) an operationally induced shaft voltage exists between the conductive housing and the shaft and is influenced by at least one of an imbalanced ampere-turns of the stator winding, a stator winding asymmetry, a rotor asymmetry, and an electrostatic charge due to operation of the compressor system.

11. A compressor system, comprising:
a conductive housing made of a conductive material, the conductive housing includes a motor housing and a compressor housing;
a refrigerant disposed within the conductive housing;
a motor that includes a rotor, a shaft extending from the rotor, a stator winding disposed within the motor housing in proximity with the rotor, and a bearing supporting the shaft and the rotor within the motor housing;
a lubricant lubricating the bearing, wherein the lubricant at the bearing includes at least a trace of the refrigerant;
a compressing element disposed within the compressor housing and being coupled to the rotor such that rotation of the rotor motivates the compressing element to compress the refrigerant;
a labyrinth seal in general proximity with the compressing element, wherein the refrigerant at the labyrinth seal includes at least a trace of the lubricant;
an adjustable frequency drive that provides the stator winding with three-phase electrical power to rotate the rotor;
three conductors electrically coupling the adjustable frequency drive to the stator winding such that the three conductors can convey the three-phase electrical power to the stator winding;
an inductor comprising a ring of magnetic material that encircles the three conductors; and
a ground return path conductor made of a material that is more electrically conductive than the conductive material of the conductive housing, the ground return path conductor extends from the adjustable frequency drive to a point on the conductive housing, wherein the point is closer to the bearing than to the labyrinth seal.

12. The compressor system of claim 11, wherein the ground return path conductor lies outside the inductor, whereby the inductor does not encircle the ground return path conductor.

13. The compressor system of claim 12, wherein the compressor system includes a number of compressing elements including the compressing element, and the compressor system includes a number of inductors including the inductor, wherein a high frequency common mode voltage exists between the conductive housing and the stator winding, wherein the high frequency common mode voltage drives a high frequency common mode current through the conductive housing, and wherein the number of inductors is sufficient to create an inductance reducing the common mode current.

14. The compressor system of claim 11, wherein the adjustable frequency drive includes a plurality of switching devices and wherein:
a) a high frequency common mode voltage is caused by a switching operation of the plurality of switching devices and exists between the conductive housing and the stator winding;
b) the high frequency common mode voltage drives a high frequency common mode current through the conductive housing;

c) the high frequency common mode current passing through the conductive housing creates a high frequency internal voltage;
d) the high frequency internal voltage provides a high frequency shaft voltage between the conductive housing and the shaft; and
e) an operationally induced shaft voltage exists between the conductive housing and the shaft and is influenced by at least one of an imbalanced ampere-turns of the stator winding, a stator winding asymmetry, a rotor asymmetry, and an electrostatic charge due to operation of the compressor system and wherein the conductive housing is subjected to a composite adverse voltage that is comprised of a plurality of component voltages including the operationally induced shaft voltage, wherein a high frequency common mode voltage exists between the conductive housing and the stator winding and the high frequency common mode voltage drives a high frequency common mode current through the conductive housing and wherein the adjustable frequency drive can power the stator winding to rotate the rotor at a certain rated speed and torque even if the inductor were omitted such that, at the certain rated speed and torque, the high frequency common mode current has a frequency that is lower by a certain percentage when the inductor is in the installed position than if the inductor were omitted, and the certain percentage is such that the inductor has a greater effect on the high frequency common mode current than on the high frequency common mode voltage, and the inductor has a greater effect on the high frequency common mode current than on the operationally induced shaft voltage, the certain percentage is sufficient to appreciably mitigate the composite adverse voltage.

15. The compressor system of claim 14, further comprising a grounding contact device supported by the conductive housing and brushing against the shaft, thereby providing an electrical path between the conductive housing and the shaft.

16. A compressor system, comprising:
a conductive housing made of a conductive material, the conductive housing includes a motor housing and a compressor housing;
a refrigerant disposed within the conductive housing;
a motor that includes a rotor, a shaft extending from the rotor, a stator winding disposed within the motor housing in proximity with the rotor, and a bearing supporting the shaft and the rotor within the motor housing;
a compressing element disposed within the compressor housing and being coupled to the rotor such that rotation of the rotor motivates the compressing element to compress the refrigerant;
an adjustable frequency drive that provides the stator winding with three-phase electrical power to rotate the rotor;
three conductors electrically coupling the adjustable frequency drive to the stator winding such that the three conductors can convey the three-phase electrical power to the stator winding;
an inductor comprising a ring of magnetic material encircling the three conductors; and
a grounding contact device supported by the motor housing and being in electrical contact with the shaft; and
a ground return path conductor extending between the adjustable frequency drive and the conductive housing, wherein the ground return path conductor is of a material that is more electrically conductive than the conductive material of the conductive housing.

17. The compressor system of claim 16, wherein the ground return path conductor lies outside the inductor, whereby the inductor does not encircle the ground return path conductor and wherein the ground return path conductor connects to the conductive housing at a point that minimizes internal voltage to the bearing.

18. The compressor system of claim 16, wherein the conductive housing is subjected to a composite adverse voltage that is comprised of a plurality of component voltages including an operationally induced shaft voltage, wherein a high frequency common mode voltage exists between the conductive housing and the stator winding and the high frequency common mode voltage drives a high frequency common mode current through the conductive housing and wherein the adjustable frequency drive can power the stator winding to rotate the rotor at a certain rated speed and torque even if the inductor were omitted such that, at the certain rated speed and torque, the high frequency common mode current has a frequency that is lower by a certain percentage when the inductor is in the installed position than if the inductor were omitted, and the certain percentage is such that the inductor has a greater effect on the high frequency common mode current than on the high frequency common mode voltage, and the inductor has a greater effect on the high frequency common mode current than on the operationally induced shaft voltage, the certain percentage is sufficient to appreciably mitigate the composite adverse voltage.

19. The compressor system of claim 18, wherein the compressor system includes at least one compressing element and a number of inductors, wherein a high frequency common mode voltage exists between the conductive housing and the stator winding, wherein the high frequency common mode voltage drives a high frequency common mode current through the conductive housing, and wherein the number of inductors is sufficient to create an inductance reducing the common mode current.

20. The compressor system of claim 18, wherein the adjustable frequency drive includes a plurality of switching devices and wherein: a) a high frequency common mode voltage is caused by a switching operation of the plurality of switching devices and exists between the conductive housing and the stator winding; b) the high frequency common mode voltage drives a high frequency common mode current through the conductive housing; c) the high frequency common mode current passing through the conductive housing creates a high frequency internal voltage; d) the high frequency internal voltage provides the high frequency shaft voltage between the conductive housing and the shaft; and e) the operationally induced shaft voltage exists between the conductive housing and the shaft and is influenced by at least one of an imbalanced ampere-turns of the stator winding, a stator winding asymmetry, a rotor asymmetry, and an electrostatic charge due to operation of the compressor system.

21. The compressor system of claim 20, wherein a housing joint exists between the motor housing and the compressor housing and further including a lubricant lubricating the bearing; wherein the lubricant at the bearing includes at least a trace of the refrigerant.

22. A compressor system, comprising:
a conductive housing;
a refrigerant disposed within the conductive housing;
a motor that includes a rotor, a shaft extending from the rotor, a stator winding disposed within the conductive housing in proximity with the rotor, and a bearing supporting the shaft and the rotor within the conductive housing;
a compressing element disposed within the conductive housing and being coupled to the rotor, such that rotation of the rotor motivates the compressing element to compress the refrigerant;
an adjustable frequency drive with a plurality of switching devices that provide the stator winding with three-phase electrical power to rotate the rotor and the shaft at various speeds including a certain rated speed and torque;
three conductors electrically coupling the adjustable frequency drive to the stator winding such that the three conductors can convey the three-phase electrical power to the stator winding and upon doing so the conductive housing is subjected to a composite adverse voltage that is comprised of a plurality of component voltages including a high frequency shaft voltage and an operationally induced shaft voltage, wherein:
a) a high frequency common mode voltage is caused by a switching operation of the plurality of switching devices and exists between the conductive housing and the stator winding;
b) the high frequency common mode voltage drives a high frequency common mode current through the conductive housing;
c) the high frequency common mode current passing through the conductive housing creates a high frequency internal voltage;
d) the high frequency internal voltage provides the high frequency shaft voltage between the conductive housing and the shaft; and
e) the operationally induced shaft voltage exists between the conductive housing and the shaft and is influenced by at least one of an imbalanced ampere-turns of the stator winding, a stator winding asymmetry, a rotor asymmetry, and an electrostatic charge due to operation of the compressor system;
an inductor comprising a ring of magnetic material and being in an installed position encircling the three conductors, however, the adjustable frequency drive can power the stator winding to rotate the rotor at the certain rated speed and torque even if the inductor were omitted such that at the certain rated speed and torque the high frequency common mode current has a frequency that is lower by a certain percentage when the inductor is in the installed position than if the inductor were omitted, and the certain percentage is such that the inductor has a greater effect an the high frequency common mode current than on the high frequency common mode voltage, and the inductor has a greater effect on the high frequency common mode current than on the operationally induced shaft voltage, the certain percentage is sufficient to appreciably mitigate the composite adverse voltage.

23. The compressor system of claim 22, further comprising a ground return path conductor extending between the adjustable frequency drive and the conductive housing, wherein the ground return path conductor is of a material that is more electrically conductive than the conductive material of the conductive housing.

24. The compressor system of claim 23, wherein the ground return path conductor lies outside the inductor, whereby the inductor does not encircle the ground return path conductor.

25. The compressor system of claim 23, wherein the ground return path conductor connects to the conductive housing at a point that minimizes internal voltage to the bearing.

26. The compressor system of claim 22, wherein the compressor system includes at least one compressing element and a number of inductors, and wherein the number of inductors is sufficient to reduce the common mode current.

27. The compressor system of claim 22, further comprising a grounding contact device supported by the conductive housing and brushing against the shaft, thereby providing an electrical path between the conductive housing and the shaft.

28. The compressor system of claim 23 wherein the housing includes a motor housing operably supporting the motor, a first stage housing, and a second stage housing, the second stage housing is interposed between the first stage housing and the motor housing;
    a first stage impeller disposed within the first stage housing and being coupled to the rotor such that rotation of the rotor motivates the first stage impeller to centrifugally compress the refrigerant;
    a second stage impeller disposed within the second stage housing and being coupled to the rotor such that rotation of the rotor motivates the second stage impeller to centrifugally compress the refrigerant;
    a point at which the ground return path conductor connects to the conductive housing, wherein the point is closer to the bearing than to the first stage impeller.

29. The compressor system of claim 28, wherein the compressor system includes a number of impellers including the first stage impeller and the second stage impeller, and the compressor system includes a number of inductors including the inductor, and wherein the number of inductors is sufficient to reduce the common mode current.

30. The compressor system of claim 28, wherein a lubricant at the bearing includes at least a trace of the refrigerant.

* * * * *